US012552172B2

(12) United States Patent
Stamp et al.

(10) Patent No.: US 12,552,172 B2
(45) Date of Patent: Feb. 17, 2026

(54) APPARATUS AND METHOD FOR PRINTING

(71) Applicant: Videojet Technologies Inc., Wood Dale, IL (US)

(72) Inventors: Michael Jeffrey Stamp, Leicester (GB); Robert Smith, Northamptonshire (GB)

(73) Assignee: Videojet Technologies Inc., Wood Dale, IL (US)

( * ) Notice: Subject to any disclaimer, the term of this patent is extended or adjusted under 35 U.S.C. 154(b) by 145 days.

(21) Appl. No.: 18/267,507

(22) PCT Filed: Dec. 16, 2021

(86) PCT No.: PCT/GB2021/053344
§ 371 (c)(1),
(2) Date: Jun. 15, 2023

(87) PCT Pub. No.: WO2022/129931
PCT Pub. Date: Jun. 23, 2022

(65) Prior Publication Data

US 2024/0051304 A1 Feb. 15, 2024

(30) Foreign Application Priority Data

Dec. 17, 2020 (GB) ..................................... 2020025

(51) Int. Cl.
*B41J 2/17* (2006.01)
*B41J 2/02* (2006.01)
(Continued)

(52) U.S. Cl.
CPC ............. *B41J 2/17523* (2013.01); *B41J 2/02* (2013.01); *B41J 2/1707* (2013.01);
(Continued)

(58) Field of Classification Search
CPC ..... B41J 2/02; B41J 2/08; B41J 2/1707; B41J 2/175; B41J 2/17523; B41J 2/1752;
(Continued)

(56) References Cited

U.S. PATENT DOCUMENTS 8,708,470 B1 4/2014 Blowfield et al.
2010/0238206 A1 9/2010 Harris et al.
(Continued)

FOREIGN PATENT DOCUMENTS

EP 3 741 571 A1 11/2020
KR 101245720 B1 4/2013
(Continued)

OTHER PUBLICATIONS

PCT International Search Report and Written Opinion for International Application No. PCT/GB2021/053344 mailing date Jul. 7, 2022, 14 pages.
(Continued)

*Primary Examiner* — Anh T Vo
(74) *Attorney, Agent, or Firm* — Foley & Lardner LLP

(57) ABSTRACT

Apparatus for continuous ink jet printing, comprising: an ink system comprising an ink storage tank (15) operable to supply ink to a print head associated with the apparatus; a single cartridge connection (9) for releasable engagement with a fluid cartridge (8), the cartridge connection (9) comprising: a fluid connector (10) for engaging an outlet of a fluid cartridge; and a conduit configured to allow fluid to flow along a fluid pathway from a cartridge engaged with the cartridge connection, via the fluid connector, to the ink storage tank. The apparatus has a first configuration in which a solvent cartridge is engaged with the cartridge connection and in which the apparatus is configured to receive solvent from the engaged solvent cartridge, and a second configuration in which an ink cartridge is engaged with the cartridge
(Continued)

Figure 1:
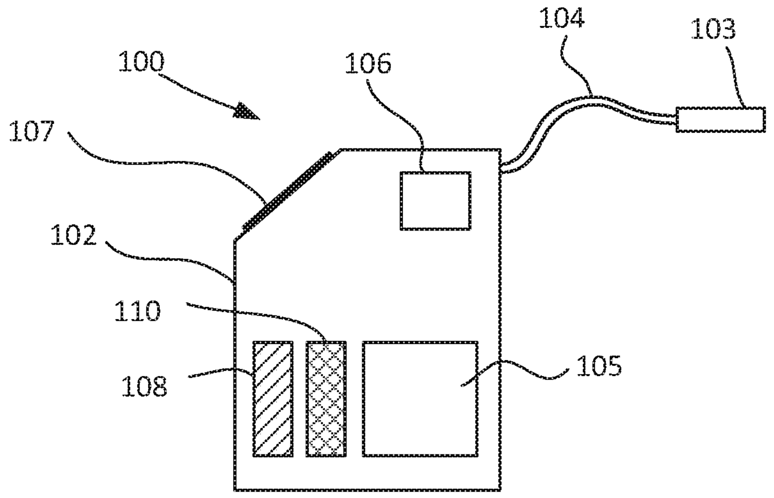

connection and in which the apparatus is configured to receive ink from the engaged ink cartridge.

18 Claims, 7 Drawing Sheets

(51) Int. Cl.
*B41J 2/175* (2006.01)
*B41J 29/17* (2006.01)

(52) U.S. Cl.
CPC ....... *B41J 2/17546* (2013.01); *B41J 2/17566* (2013.01); *B41J 29/17* (2013.01); *B41J 2002/022* (2013.01)

(58) Field of Classification Search
CPC ................ B41J 2/17546; B41J 2/17566; B41J 2002/022; B41J 2/195; B41J 29/17
See application file for complete search history.

(56) References Cited

U.S. PATENT DOCUMENTS

| | | | |
|---|---|---|---|
| 2012/0327145 A1 | 12/2012 | Pouzet | |
| 2015/0145928 A1 | 5/2015 | Stamp et al. | |
| 2016/0288522 A1* | 10/2016 | Pourtier | B41J 2/185 |
| 2017/0246876 A1 | 8/2017 | Michallon et al. | |
| 2018/0029375 A1 | 2/2018 | Pourtier et al. | |
| 2018/0250941 A1 | 9/2018 | Suzuki et al. | |
| 2018/0354283 A1 | 12/2018 | Stamp et al. | |

FOREIGN PATENT DOCUMENTS

| | | |
|---|---|---|
| WO | WO-93/18920 A1 | 9/1993 |
| WO | WO-2014/044805 A1 | 3/2014 |
| WO | WO-2015/129326 A1 | 9/2015 |

OTHER PUBLICATIONS

International Preliminary Report on Patentability for PCT Application No. PCT/GB2021/053344, dated Jun. 13, 2023.
Search Report for UK Application No. GB2020025.9 dated Jun. 17, 2021, pp. 1-2.
Keyence Corporation, Inkjet Printer MK-G1000 Series User Manual, 2020, 162 pages.

* cited by examiner

APPARATUS AND METHOD FOR PRINTING

CROSS-REFERENCE TO RELATED APPLICATIONS

The present application is a U.S. national stage application of International Application No. PCT/GB2021/053344, filed Dec. 16, 2021, which claims priority to U.K. Application. No. 2020025.9, filed Dec. 17, 2020, both of which are incorporated herein by reference in their entireties and for all purposes.

The present invention relates to continuous inkjet printing and more particularly to apparatus for continuous inkjet printing using ink, such as pigmented ink, an inkjet printer, and a method of operating the same.

In inkjet printing systems the print is made up of individual droplets of ink generated at a nozzle and propelled towards a substrate. There are two principal systems: drop on demand where ink droplets for printing are generated as and when required; and continuous inkjet printing in which droplets are continuously produced and only selected ones are directed towards the substrate, the others being recirculated to an ink supply.

Continuous inkjet printers supply pressurised ink to a print head drop generator where a continuous stream of ink emanating from a nozzle is broken up into individual regular drops by, for example, an oscillating piezoelectric element. The drops are directed past a charge electrode where they are selectively and separately given a predetermined charge before passing through a transverse electric field provided across a pair of deflection plates. Each charged drop is deflected by the field by an amount that is dependent on its charge magnitude before impinging on the substrate whereas the uncharged drops proceed without deflection and are collected at a gutter from where they are recirculated to the ink supply for reuse. The charged drops bypass the gutter and hit the substrate at a position determined by the charge on the drop and the position of the substrate relative to the print head. Typically the substrate is moved relative to the print head in one direction and the drops are deflected in a direction generally perpendicular thereto, although the deflection plates may be oriented at an inclination to the perpendicular to compensate for the speed of the substrate (the movement of the substrate relative to the print head between drops arriving means that a line of drops would otherwise not quite extend perpendicularly to the direction of movement of the substrate).

In continuous inkjet printing a character is printed from a matrix comprising a regular array of potential drop positions. Each matrix comprises a plurality of columns (strokes), each being defined by a line comprising a plurality of potential drop positions (e.g. seven) determined by the charge applied to the drops. Thus each usable drop is charged according to its intended position in the stroke. If a particular drop is not to be used then the drop is not charged and it is captured at the gutter for recirculation. This cycle repeats for all strokes in a matrix and then starts again for the next character matrix.

Ink is delivered under pressure to the print head by an ink supply system that is generally housed within a sealed compartment of a cabinet that includes a separate compartment for control circuitry and a user interface panel. The system includes a main pump that draws the ink from a tank of the ink supply system via a filter and delivers it under pressure to the print head. As ink is consumed the tank is refilled as necessary from a replaceable ink cartridge that is releasably connected to the tank by a supply conduit. The ink is fed from the tank via a flexible delivery conduit to the print head. The unused ink drops captured by the gutter are recirculated to the tank via a return conduit by a pump. The flow of ink in each of the conduits is generally controlled by solenoid valves and/or other like components.

As the ink circulates through the system, there is a tendency for it to thicken as a result of solvent evaporation, particularly in relation to the recirculated ink that has been exposed to air in its passage between the nozzle and the gutter. In order to compensate for this, "make-up" solvent is added to the ink as required from a replaceable solvent cartridge so as to maintain the ink viscosity within desired limits. This solvent may also be used for flushing components of the print head, such as the nozzle and the gutter, in a cleaning cycle. Therefore, a typical continuous inkjet printer has both a replaceable ink cartridge and a replaceable solvent cartridge. In this description, both ink cartridge and solvent cartridge are referred to as cartridges.

Various types of inks maybe used within the continuous inkjet printers. The ink may include an organic solvent selected from $C_1$-$C_4$ alcohols, $C_4$-$C_8$ ethers, $C_3$-$C_6$ ketones, $C_3$-$C_6$ esters, and mixtures thereof. Inks may contain different types of colourant. In some circumstances dye based inks are used. This may typically be the case where the substrate onto which printing is performed is relatively light in colour such that light reflected from the surface on which printing is to be performed is coloured by the dye contained within the ink resulting in a pattern visible to the user. On the other hand, where a surface on which printing is conducted is dark in colour, and therefore does not reflect much light, pigmented inks maybe preferred. In such the circumstances, the pigment contained within the ink may reflect certain colours of light, thereby ensuring that the printed image can be seen by a user. Of course, dye based, and pigmented inks may both be used for printing on some substrates, while pigmented inks may be used on light surfaces and, dye-based inks may be used on dark surfaces.

Where pigmented inks are used, the ink consists of a suspension of colourant (i.e. pigment) particles within a solvent. Various other components or additives (e.g. surfactants) may also be included within the composition of the ink. The ink composition may vary independence upon various characteristics, such as the colour required, the surface onto which printing is to be performed, solvents which are suitable for a particular application environment, and many other factors.

Inks may be required to be stored for extended periods of time. For example, it may be that a stock of ink is held which will be required to be used at any time, and which may need to be stored for several months before being used. Moreover, when an ink cartridge is installed within a printer, it may be that ink is withdrawn from the cartridge at various times. That is, it may be that ink is gradually withdrawn from the cartridge over an extended period of time, rather than being withdrawn within a single operation, or at a single time.

It will be understood, however, that during periods of extended storage, pigment particles can settle within a cartridge, forming a layer of sediment at the bottom surface of the cartridge. The sediment layer may be characterised by an extremely thick and viscous layer of ink which could cause blockages of ink supply pathways if it was to enter into the internal circuits of the printer. As such, printers for pigmented ink typically operate differently to printers for non-pigmented (i.e. dye-based) inks. For example, cartridges for pigmented inks could be provided with a stirring device (e.g. a magnetic device), or some other form of disturbance mechanism (e.g. a fluid jet within the cartridge), which mixes ink within the cartridge once it has been installed in a printer. However, this will result in a more complex printer, or printing operation.

It is an object of the present invention, among others, to provide apparatus for inkjet printing (such as a continuous inkjet printer) which solves one or more problems, whether identified above or otherwise, of using pigmented inks.

According to a first aspect of the present disclosure, there is provided an apparatus for continuous ink jet printing. The apparatus comprises an ink system comprising an ink storage tank operable to supply ink to a print head associated with the apparatus. The apparatus further comprises a single cartridge connection for releasable engagement with a fluid cartridge, the cartridge connection comprising: a fluid connector for engaging an outlet of a fluid cartridge. The apparatus further comprises a conduit configured to allow fluid to flow along a fluid pathway from a cartridge engaged with the cartridge connection, via the fluid connector, to the ink storage tank. The apparatus has a first configuration in which a solvent cartridge is engaged with the cartridge connection and in which the apparatus is configured to receive solvent from the engaged solvent cartridge, and a second configuration in which an ink cartridge is engaged with the cartridge connection and in which the apparatus is configured to receive ink from the engaged ink cartridge.

That is, the apparatus comprises a single cartridge connection which engages with both ink and solvent cartridges. Contrary to conventional continuous inkjet printers, no separate ink and solvent connections are provided. By configuring the apparatus in this way, it is possible to reduce or avoid negative consequences associated with ink sediment or residue remaining in components of the connector or associated conduits when an ink cartridge remains connected to a connector for an extended period of time. For example, by providing a single cartridge connection, it is possible to use solvent provided by a solvent cartridge to flush or clean components that may have become contaminated with ink during ink refilling when a solvent cartridge is subsequently replaced.

The single cartridge connection allows for releasable engagement with a single fluid cartridge at any time. The single fluid cartridge may be one of the solvent cartridge and the ink cartridge. The single cartridge connection may comprise a single fluid connector.

The fluid connector may be configured to engage an outlet of the solvent cartridge in the first configuration of the apparatus, and is configured to engage an outlet of the ink cartridge in the second configuration of the apparatus.

By engaging the same fluid connector with the ink cartridge and the solvent cartridge in different configurations of the apparatus, it is possible to reduce the risks of any blockage in the fluid connector caused by ink sediment or residue, because solvent provided by the solvent cartridge would flush or clean the fluid connector in the first configuration.

The conduit may be in fluid communication with the ink cartridge in the second configuration, and at least a part of the conduit may be in fluid communication with the solvent cartridge in the first configuration.

The cartridge connection may comprise a needle configured to receive both ink and solvent.

The fluid connector may thus comprise a needle which can be used to extract both ink and solvent when an ink or solvent cartridge is engaged with the connector. Conventionally, a particular needle will only ever be used to remove either ink or solvent, but not both. Moreover, while it may be physically possible to install an ink cartridge onto a solvent cartridge connection in a conventional printer (or vice versa), no ink would be received by the needle in such a situation since the apparatus would be configured to prevent such operations from occurring in order to protect the internal components of the printer.

The needle may be disposed within a generally cylindrical bore in the apparatus. The bore may be configured to receive a correspondingly sized cartridge outlet. The cartridge outlet may comprise a septum, which is pierced by the needle, when the cartridge is engaged with the cartridge connection.

The cartridge connection may comprise a data interface configured to obtain data indicative of the contents of an engaged cartridge.

By obtaining data indicative of the contents of an engaged cartridge it is possible to ensure the correct cartridge is installed, and to configure the apparatus to extract the cartridge contents in an appropriate way. For example, when an ink cartridge is engaged, the apparatus may be configured to extract substantially the entire cartridge contents from the cartridge and transfer it to the ink storage tank. On the other hand, when a solvent cartridge is engaged, the apparatus may be configured to extract sufficient solvent to perform a cleaning process, and to then extract further solvent from the cartridge and transfer it to the ink storage tank in order to maintain ink viscosity, or to a separate solvent storage tank in order to maintain a solvent level.

The data interface may comprise an electrical contact configured to contact a corresponding contact on an engaged fluid cartridge.

Alternatively, the data interface may comprises a wireless data transmission interface (e.g. NFC, RFID, etc.).

The apparatus may comprise a housing containing the ink system, wherein the printhead is disposed externally of the housing. The housing may comprise a cabinet.

The apparatus may further comprise the printhead.

The apparatus may be referred to as a continuous inkjet printer.

The printhead may be connected to the ink system via an umbilical. The printhead may be fluidically and electrically connected to the housing via the umbilical.

In the second configuration, the apparatus may be configured to extract substantially the entire contents of the engaged ink cartridge from the cartridge and into ink storage tank.

By emptying the entire contents of the engaged ink cartridge it may be meant that a very substantial portion (e.g. greater than 90%) of the contents is extracted. Further, the extraction may be configured to occur in a single operation, or at least in a relatively short time period, so as to minimise, or at least reduce, the duration of the ink extraction operation. The ink extraction operation may preferably be configured to last a shorter duration than is required for a solvent cartridge to be replaced. In this way, printing operations can continue uninterrupted when an ink cartridge is replaced.

In the first configuration, the apparatus may be configured to extract solvent from the engaged solvent cartridge and provide the solvent into a solvent storage tank.

Alternatively, where a solvent storage tank is not present, solvent may be extracted directly from the solvent cartridge into the ink storage tank.

The apparatus may be configured to add solvent to the ink storage tank based upon data indicative of ink viscosity.

The apparatus may further comprise a controller configured to control operations of the ink system and the printhead.

The controller may be containing within the housing. The housing may comprise a user interface. The user interface may comprise a screen configured to display information to a user, and a user input device configured to receive information from a user. The screen may be a touch screen configured to receive information from a user.

The controller may be configured to detect a cartridge engaged with the cartridge connection. The controller may be configured to determine a type of the cartridge.

By determining a type of cartridge, it may be meant that it is determined if the cartridge is an ink cartridge or a solvent cartridge. Further determinations may also be made relating to the nature of the cartridge and the contents thereof (e.g. a type of ink or solvent, a quantity of ink or solvent, operating parameters of the ink or solvent etc.).

The controller may be configured to determine that additional ink is required and generate an indication that additional ink is required.

The controller may determine that additional ink is required based on an ink level within the ink storage tank. For example, the determination may be made based on the ink level being below a refill threshold level. The refill threshold level may be level at which there is sufficient capacity within the ink storage tank to receive the contents of an entire ink cartridge.

The controller may be configured to detect an ink cartridge engaged with the cartridge connection. The controller may be configured to cause the ink system to extract substantially the entire contents of the engaged ink cartridge from the cartridge and into ink storage tank.

The controller may be configured to cause the ink system to extract substantially the entire contents of the engaged ink cartridge from the cartridge and into ink storage tank only after the indication has been generated, and provided another ink cartridge has not been engaged.

By causing the ink system to extract ink or solvent from an engaged cartridge, it is meant that components of the ink system, such as, for example, pumps and/or valves are operated to cause fluid to flow from the engaged cartridge, via the cartridge connection, to a location within the ink system.

The controller may be configured to determine that additional solvent is required and generate an indication that additional solvent is required.

The controller may determine based on the apparatus having recently engaged and emptied an ink cartridge, that a solvent cartridge should be installed.

The controller may be configured to detect a solvent cartridge engaged with the cartridge connection. The controller may be configured to cause the ink system to extract solvent from the engaged solvent cartridge into the ink system.

The controller may be configured to detect a solvent cartridge engaged with the cartridge connection after an ink refill operation has been performed. The controller may be configured to cause the ink system to perform a cleaning operation.

The cleaning operation may be performed immediately (or at least shortly) following an ink refill operation.

The cleaning operation may comprise causing solvent to flow from the engaged solvent cartridge via the cartridge connection into the ink system.

According to a second aspect, there is also provided a method of operating apparatus for continuous ink jet printing. The apparatus comprises an ink system comprising an ink storage tank operable to supply ink to a print head associated with the apparatus. The apparatus further comprises a single cartridge connection for releasable engagement with a fluid cartridge, the cartridge connection comprising a fluid connector for engaging an outlet of a fluid cartridge. The apparatus further comprises a conduit configured to allow fluid to flow along a fluid pathway from a cartridge engaged with the cartridge connection, via the fluid connector, to the ink storage tank. The method comprises in a first configuration in which a solvent cartridge is engaged with the cartridge connection, receiving solvent from the engaged solvent cartridge; and in a second configuration in which an ink cartridge is engaged with the cartridge connection, receiving ink from the engaged ink cartridge.

In the second configuration, the method may comprise extracting substantially the entire contents of the engaged ink cartridge from the cartridge and into ink storage tank.

In the first configuration, the method may comprise extracting solvent from the engaged solvent cartridge and providing the solvent into a solvent storage tank.

The method may comprise obtaining data indicative of ink viscosity. Adding solvent to the ink storage tank may be based upon the data indicative of ink viscosity.

The method may comprise, determining that additional ink is required to be added to the ink storage tank and generating an indication that additional ink is required.

The method may comprise detecting a cartridge engaged with the cartridge connection, and determining a type of the cartridge. The detecting and/or determining may be performed by a controller.

The method may comprise detecting an ink cartridge engaged with the cartridge connection, and causing the ink system to extract substantially the entire contents of the engaged ink cartridge from the cartridge and into ink storage tank.

The method may comprise detecting a solvent cartridge engaged with the cartridge connection after an ink refill operation has been performed. The method may comprise causing the ink system to perform a cleaning operation.

The cleaning operation may comprise causing solvent to flow from the engaged solvent cartridge via the cartridge connection into the ink system.

According to a third aspect, there is provided a method of operating an apparatus for ink jet printing. The method comprises connecting an ink cartridge with a cartridge connection of the apparatus, transferring ink from the ink cartridge to a location within the apparatus, disconnecting the ink cartridge from the cartridge connection of the apparatus, and connecting a solvent cartridge with the cartridge connection of the apparatus.

The location within the apparatus may be an ink storage tank.

The method may further comprise, after connecting the solvent cartridge with the cartridge connection of the apparatus, transferring solvent from the solvent cartridge to a location within the apparatus.

The method may further comprise disconnecting the solvent cartridge from the cartridge connection of the apparatus. The location within the apparatus to which solvent is transferred may be the same as the location to which ink is transferred (e.g. an ink storage tank), or a different location. The location may be a solvent storage tank.

Transferring solvent from the solvent cartridge to a location within the apparatus and transferring ink from the ink cartridge to a location within the apparatus may comprise pumping ink or solvent from the respective cartridge via the same cartridge connection.

Transferring solvent from the solvent cartridge to a location within the apparatus may comprise transferring solvent from the solvent cartridge to a solvent storage tank within the apparatus, or an ink storage tank within the apparatus.

Transferring ink from the ink cartridge to a location within the apparatus may comprise transferring ink from the ink cartridge to an ink storage tank within the apparatus.

The method may comprise determining that additional ink is required to be added to a location within the apparatus, and generating an indication that additional ink is required. The location may be an ink storage tank.

The method may comprise detecting a cartridge engaged with the cartridge connection, and determining a type of the detected cartridge.

The method may comprise detecting an ink cartridge engaged with the cartridge connection, and, after the ink cartridge has been detected, causing the ink system to extract substantially the entire contents of the detected ink cartridge from the cartridge and into an ink storage tank within the apparatus.

The method may comprise detecting a solvent cartridge engaged with the cartridge connection after an ink refill operation has been performed. The method may further comprise after the solvent cartridge has been detected, performing a cleaning operation.

The detecting may be performed by the apparatus.

The cleaning operation may comprise causing solvent to flow from the detected solvent cartridge via the cartridge connection into an ink system of the apparatus.

The apparatus may be a continuous inkjet printer. The method of the second or third aspects may further comprise performing a printing operation comprising supplying ink to a print head associated with the continuous inkjet printer.

Features described above with reference to one aspect of the present disclosure may be combined with other aspects of the disclosure. For example, features of the apparatus described above may be applied to the methods also described above.

Figure 2:
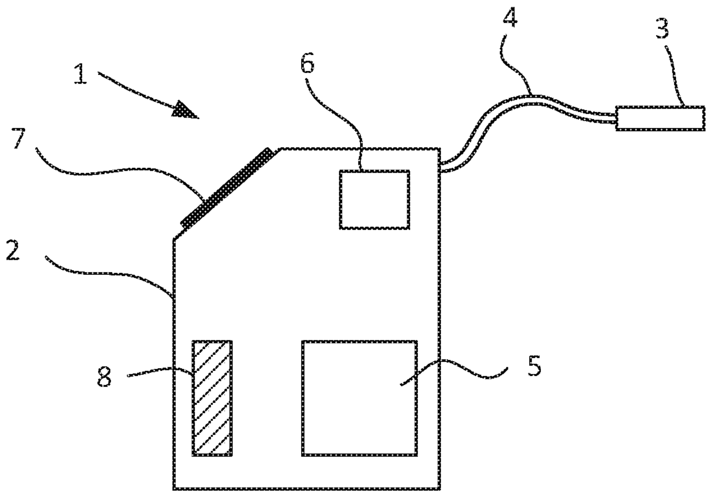
Figure 3:
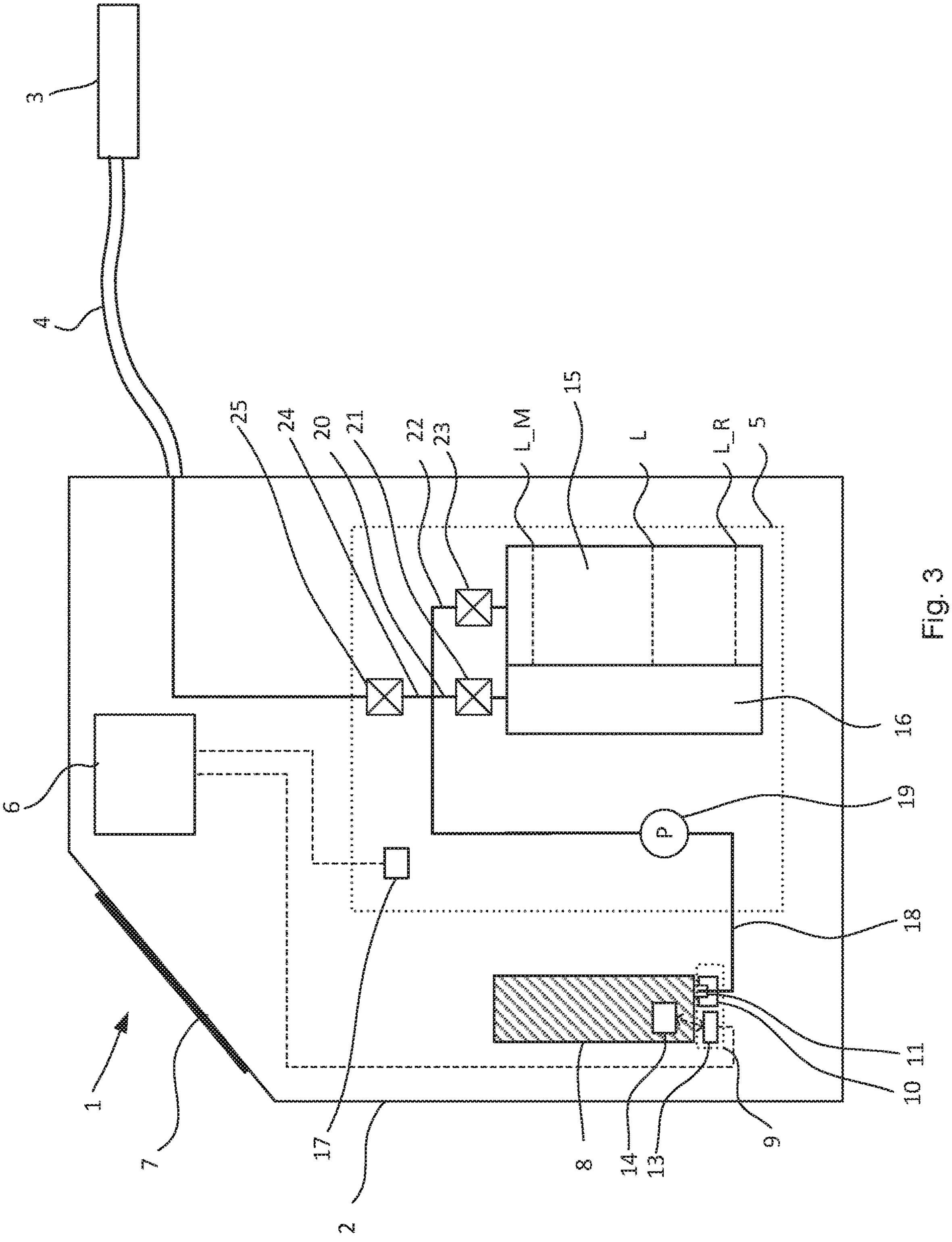
Figure 4:
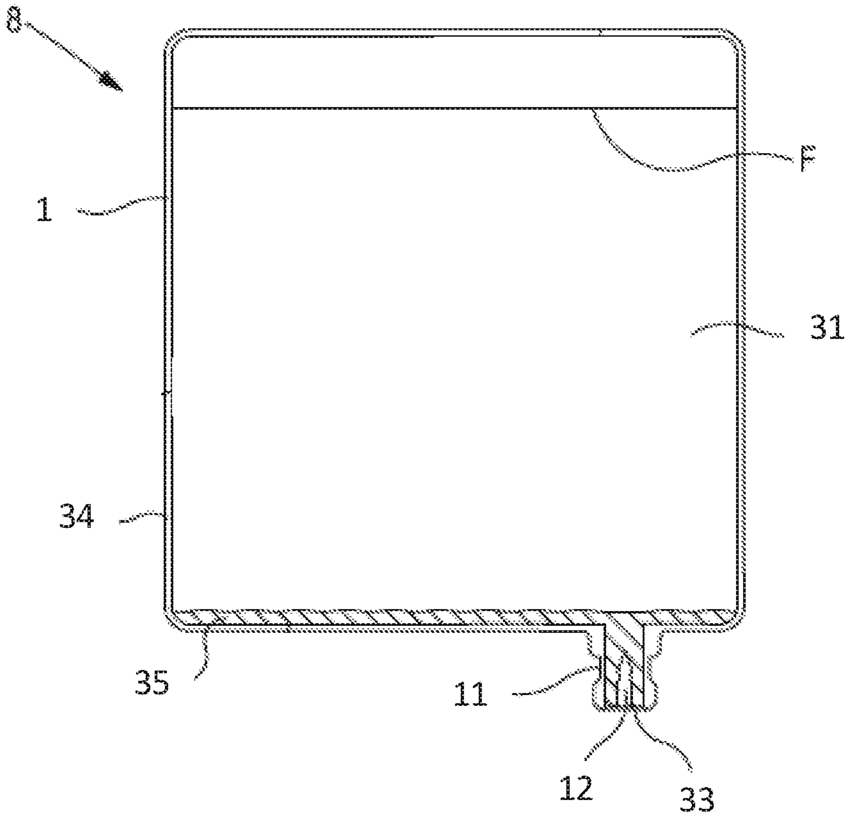
Figure 5A:
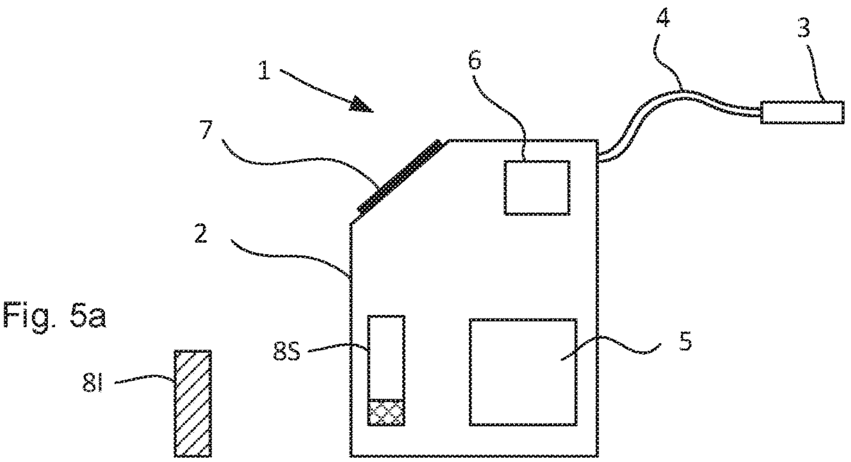
Figure 5B:
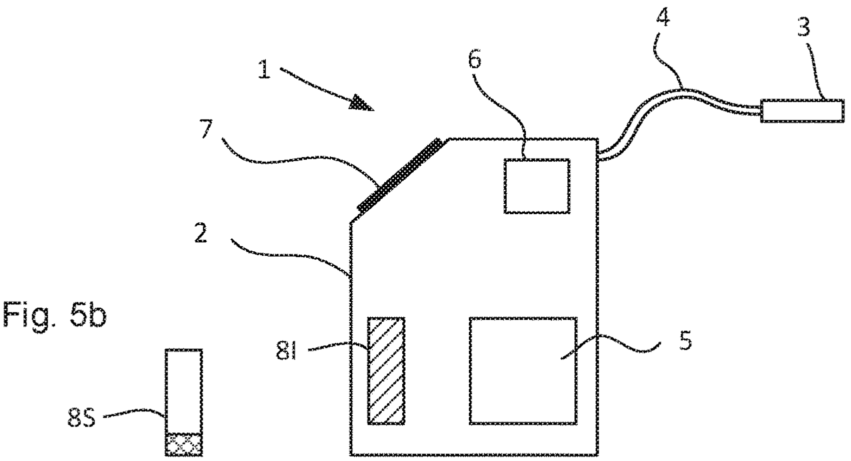
Figure 5C:
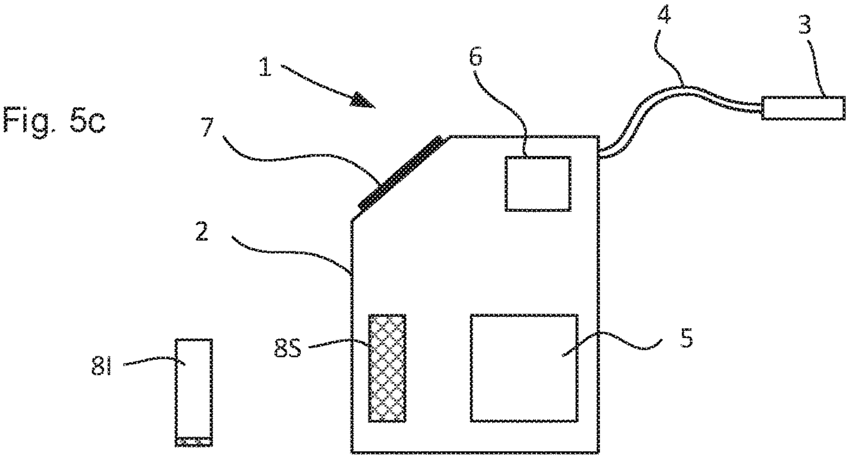
Figure 6:
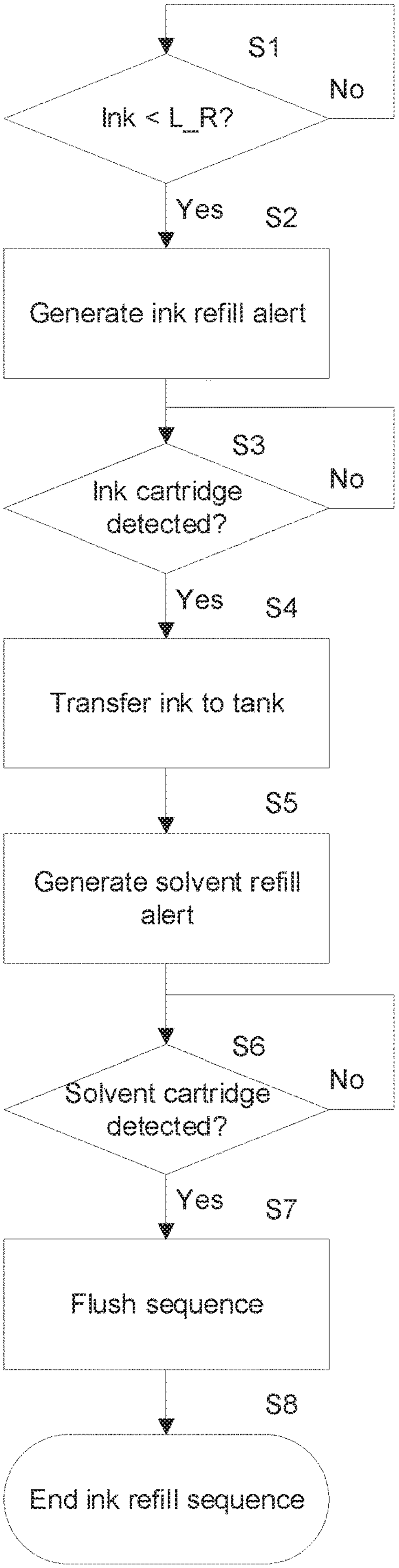
Figure 7:
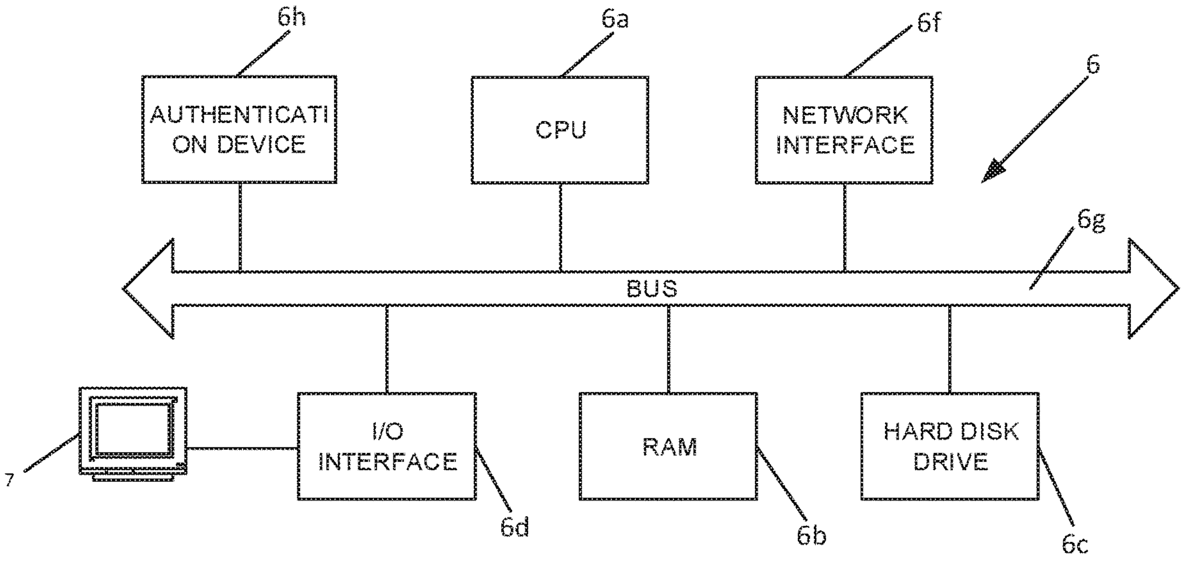
Figure 8:
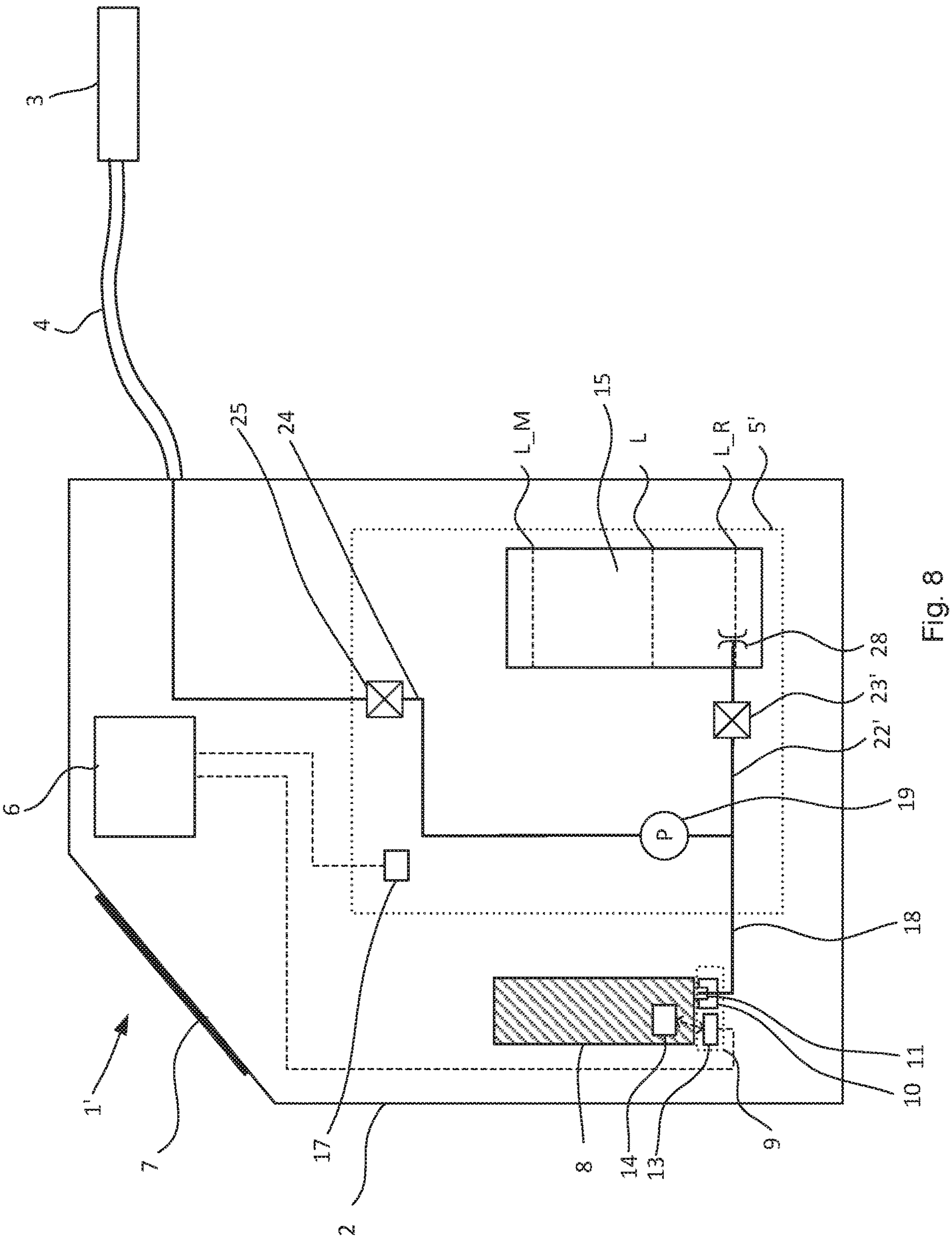

Embodiments of the invention will now be described, by way of example only, with reference to the accompanying drawings in which:

FIG. 1 schematically illustrates a known continuous inkjet printer;

FIG. 2 schematically illustrates a continuous inkjet printer according to the present disclosure;

FIG. 3 schematically illustrates fluid connections within the continuous inkjet printer shown in FIG. 2;

FIG. 4 schematically illustrates a cross-section of an ink cartridge for use with the continuous inkjet printer shown in FIG. 2;

FIGS. 5*a* to 5*c* schematically illustrate an ink refill operation of the continuous inkjet printer shown in FIG. 2;

FIG. 6 schematically illustrates a process performed by a controller of the continuous inkjet printer shown in FIG. 2;

FIG. 7 schematically illustrates a controller of the continuous inkjet printer shown in FIG. 2; and FIG. 8 schematically illustrates fluid connections within an alternative continuous inkjet printer.

In the figures, like parts are denoted by like reference numerals. It will be appreciated that the drawings are for illustration purposes only and may not be drawn to scale.

FIG. 1 schematically illustrates a known inkjet printer 100. The printer 100 comprises an ink system 102 connected to printhead 103 by an umbilical cable 104. The ink system 102 may be referred to as a printer housing and may house an ink supply system 105 and a printer controller 106. The printer housing 102 may also have an interface 107 (e.g. a display, keypad, and/or touch screen) for use by an operator. The printhead 102 is arranged to print on a substrate provided adjacent to the printhead. The printer 100 typically comprises two cartridge connections for engagement with respective fluid cartridges. In particular, the printer 100 may comprise an ink cartridge connection for engagement with an ink cartridge 108 and a solvent cartridge connection for engagement with a solvent cartridge 110. The cartridge connections typically each comprise a fluid port arranged to connect to a fluid pathway within the inkjet printer 100 to allow fluid to flow between the cartridges 108, 110 and other parts of the inkjet printer 100, such as the ink supply system 105 and the print head 103 (via the umbilical 104). In operation, ink from the ink cartridge 108 and solvent from the solvent cartridge 110 can be mixed within the ink supply system 105 so as to generate printing ink of a desired viscosity which is suitable for use in printing. This ink is supplied to the print head 103 and unused ink is returned from the print head 103 to the ink supply system 105. When unused ink is returned to the ink supply system 105 from the print head 103 air may be drawn in with ink from a gutter of the print head 103. The air may then become saturated with solvent in the gutter line. In operation, ink is delivered under pressure from the ink supply system 105 to the print head 103 and recycled back via flexible tubes which are bundled together with other fluid tubes and electrical wires (not shown) into the umbilical cable 104. In order to maintain correct consistency of the ink, the ink supply system 105 may be operable to mix ink removed from the cartridge 108 with solvent removed from the cartridge 110 and to mix them together so as to obtain an ink having the correct viscosity and/or density for a particular printing application.

It will be understood, however, that parts of the printer 100 through which pigmented inks are caused to flow, such as, for example, the ink cartridge connection, and associated components, such as, for example, a needle, conduits, and valves, may become blocked with pigment deposits. Furthermore, while it may be possible, or even necessary in some cases, for make-up solvent to be flushed through various components and flow paths of the ink supply system 105 to clear pigment, it will be understood that it may not be possible for solvent to be flushed through all components of the printer 100. In particular, components and flow paths associated with and immediately downstream of the ink cartridge connection may be configured in such a way that it is not possible to cause solvent to flow through them. For example, since the ink cartridge 108 typically comprises a single outlet, and no second fluid access port, there may be no way to cause solvent to flow through the outlet, or through the ink conduit which carries ink away from the ink cartridge 108. These components and regions of the ink supply system can become blocked, or at least restricted by ink deposits.

FIG. 2 schematically illustrates an inkjet printer 1 according to the present disclosure. The printer 1 comprises an ink system 2 connected to printhead 3 by an umbilical cable 4. The ink system 2 may be referred to as a printer housing and may house an ink supply system 5 and a printer controller 6. The printer housing 2 may also have a user interface 7 (e.g. a display, keypad, and/or touch screen) for use by an operator. The printhead 2 is arranged to print on a substrate provided adjacent to the printhead.

The printer 1 comprises a single cartridge connection for engagement with a single fluid cartridge (at any one time). The cartridge connection comprises a fluid port arranged to connect to a fluid pathway within the inkjet printer 1 to allow fluid to flow between an installed cartridge 8 and other parts of the inkjet printer 1, such as the ink supply system 5 and the print head 3 (via the umbilical 4).

The ink system 2 may be referred to as an apparatus for printing. Such an apparatus, when combined with an umbilical and printhead may then form the printer 1.

Referring now to FIG. 3, fluid flow paths within the inkjet printer 1 will be described in more detail. The inkjet printer 1 corresponds to that shown in FIG. 2, with additional internal components shown schematically. As described above, unlike the printer 100, the printer 1 comprises a single cartridge connection for engagement with a fluid cartridge. In particular, the printer 1 comprises a cartridge connection 9 for releasable engagement with fluid cartridge 8. The cartridge connection comprising a fluid connector 10 arranged to releasably engage with an outlet 11 of the fluid cartridge 8, so as to allow fluid to flow between the cartridge 8 and components within the inkjet printer 1, such as the ink supply system 5 and the print head 3 (via the umbilical 4). The fluid connector 10 comprises a needle 12, which is configured to be inserted into the outlet 11 (as described in more detail below).

The cartridge connection 9 may further comprise a data interface 13 arranged to facilitate communication with an electronic storage device 14 associated with the fluid cartridge, so as to allow data to be exchanged between the cartridge 8 and the controller 6 of the inkjet printer 1. The data interface 13 may be configured to obtain data indicative of the contents of an engaged cartridge, for example by receiving data from the electronic storage device 14. The data interface 13 may comprise one or more electrical connectors, configured to engage with one or more electrical contacts provided by the cartridge 8. Alternatively, the data interface 13 may comprise one or more contactless components configured to wirelessly communication with one or more components provided by the cartridge, for example via RFID (passive of active), or other wireless communications mechanism (e.g. NFC).

The ink supply system 5 comprises an ink storage tank 15 in which ink and solvent are mixed together. The ink storage tank 15 may alternatively be referred to as a mixing tank, or mixing chamber. The ink supply system 5 further comprises a make-up solvent storage tank 16 (or solvent reservoir), which comprises a reservoir of solvent which can be used to adjust the viscosity of the ink within the ink storage tank 15 even when a solvent cartridge is not present. This ink supply system 5 further comprises an electronic component 17 (e.g. a smart-chip), which is in communication with the controller 6.

Fluid can be removed from the cartridge 8 via the connector 10, and then pass into a conduit 18 under the influence of a pump 19. To enable fluid to be transported to various destinations within the ink supply system 5, various further conduits are provided. In particular, solvent can be transferred to the solvent storage tank 16 from the cartridge connection 9 via the conduit 18, and then a solvent conduit 20, with a solvent valve 21 being provided to selectively permit the flow of fluid (under the control of controller 6). Alternatively, ink can be transferred to the ink storage tank 15 from the cartridge connection 9 via the conduit 18, and then an ink conduit 22, with an ink valve 23 being provided to selectively permit the flow of fluid (under the control of controller 6). Further, ink or solvent can be transferred directly to the printhead 3 from the cartridge connection 9 via the conduit 18, and then a printhead conduit 24, with a printhead valve 25 being provided to selectively permit the flow of fluid (under the control of controller 6).

It will be understood, therefore, that fluid can be transferred from an installed cartridge 8 to any one of several destinations via the common portion of conduit 18, and then via any of the further conduits 20, 22, 24, as required. The conduits 18, 20, 22, 24 may be configured to provide various fluid pathways from a cartridge engaged with the cartridge connection 9.

It will also be understood that the ink supply system 5 includes various further valves, pumps, conduits and filters that are not shown or described, and which are in fluid communication with the conduits 18, 20, 22, 24 and which are configured to enable ink and solvent to be caused to flow along various fluid pathways in order to carry out printing operations. Further, several fluid conduits may be provided within the umbilical to enable ink, solvent, recirculated (solvent laden) air, and recirculated ink to be transported between the ink supply system 5 and the printhead 3. The detailed operation of the printer will not be described in detail herein. However, in general terms, the operation may, for example, be similar to that described in WO2016/205168, which is herein incorporated by reference.

FIG. 4 shows a schematic cross-section view of a cartridge 8 which may be suitable for use within the printer 1 described above. The cartridge 8 includes a reservoir 30 defining an internal volume 31. The cartridge 8 further comprises the outlet 11 for dispensing the contents of the cartridge 8 to the ink supply system 5 of the printer 1. The outlet 11 may be provided with a fluid-tight seal 33 or valve which forms a fluid-tight engagement with the fluid connector 10 of the ink supply system 5. The seal 33 may be a septum. In use, the seal 33 is pieced by the needle 12 of the connector 10. The connector 10 may further comprise a generally cylindrical bore, in which the needle 12 is disposed. The bore is sized to receive a correspondingly sized cartridge outlet 11.

The reservoir 30 comprises a wall 34 formed integrally with the outlet 11. There is no venting hole provided in the reservoir 30. As such, the outlet 11 provides the only fluid pathway between the internal volume 31 within the reservoir 30 and the outside. A negative pressure is applied (by the pump 19 provided within the ink supply system 5) to the outlet 11, resulting in fluid being removed from the reservoir 30. During use, the pressure within the reservoir gradually decreases as more fluid is removed, and the absence of any venting hole prevents air (or another gas) from entering the reservoir to equalise the pressure. As a consequence, as fluid is dispensed from the reservoir 30, the reservoir 30 begins to collapse (or deform) in order to accommodate the decreasing internal volume of the reservoir 30.

The cartridge illustrated in FIG. 4 is an ink cartridge, although a solvent cartridge may have a substantially identical structure, and in particular, an identical outlet arrangement, so as to allow engagement with the same cartridge connection 9.

As described above, particles of pigmented ink can settle during storage to form a sediment layer. Such a sediment layer 35 can be seen along the base of the cartridge 8 in FIG. 3. The sediment layer may be the thickness of several millimeters (e.g. 3 mm) in the bottom or sides of the cartridge. The sediment layer may have formed after several days, weeks, or months of storage. For example, a sediment layer may begin to form after around two days of storage. It will be understood, of course, that characteristics of the formation of any sediment layer will depend upon the type and concentration of pigment within the ink. For example, pigmented inks containing hard pigment particles (e.g. $TiO_2$) may sediment more quickly than those inks containing softer pigments (e.g. Isoindoline, Quinacridone or Carbon). Sediment layers formed from hard pigmented inks may also tend to be more difficult to remove than those formed from softer pigments. Typically hard pigmented inks provide greater contrast as they are opaque and are able to reflect light. Soft pigments do this to a lesser degree.

As illustrated in FIG. 4, when the cartridge 8 is installed in a printer, the needle 12 is pushed through the septum 33 allowing ink to be removed from within the cartridge 8 (other printer components are not shown). The needle may typically extend into the outlet by up to around 10 millimeters. The length of the needle may vary between different applications. The width of the needle may also vary depending on the ink in use, and the relative rate at which the ink is to be extracted from the cartridge. It will be understood from FIG. 4 that it would be relatively easy for the outlet 11 to become blocked by the sediment 35 settling within the region of the outlet 11 surrounding the needle 12. In this case, the needle 12 may be prevented from extracting ink from the cartridge. Alternatively, sediment may be drawn into the needle, and may cause blockages in other components of the printer 1 (e.g. filters, valves, conduits, etc.). In such circumstances, operation of the printer may be stopped and cleaning may need to be carried out.

It is preferred, therefore, to ensure that once a cartridge is installed within a printer, all ink is removed within a relatively short time period (i.e. before a sediment layer 35 is able to form), and that once emptied, the cartridge is removed from the printer, so as to avoid unnecessary clogging of the needle 12. A sequence of operations for installation and use of an ink cartridge to permit correct functioning of the cartridge and printer 1, in which operation of the printer may be prolonged, and in which disruption due to blocked conduits and needles may be avoided, or at least reduced, is described in more detail below.

It will be appreciated, of course, that in the above described configuration the needle 12 is used to extract ink from the reservoir 30 via a septum 33 provided at the outlet 11. However, in alternative arrangements other fluid seals or valve arrangements may be used. Regardless of the type of fluid connector 10, it will be preferably to avoid blockages due to pigment sedimentation.

Before printing operations can be performed, fluid from the cartridge 8 (whether ink or solvent) must be drawn into the ink supply system 5. Ink and solvent are drawn into the ink storage tank 15 at different times and mixed together so as to generate printing ink of a desired viscosity which is suitable for use in printing. This ink is supplied to the print head 3 for printing. Unused ink may be returned from the print head 3 to the ink supply system 5 (e.g. to the ink storage tank 15). When unused ink is returned to the ink supply system 5 from the print head 3, air may be drawn in with ink from a gutter of the print head 3. The air may then become saturated with solvent in a gutter line.

The ink jet printer 1 is typically controlled by the controller 6. The controller 6 receives signals from various sensors within the inkjet printer 1 and is operable to provide appropriate control signals to the ink supply system 2 and the print head 3 to control the flow of ink and solvent through the inkjet printer 1.

In operation, ink is delivered under pressure from ink supply system 2 to print head 3 and recycled back via flexible tubes which are bundled together with other fluid tubes and electrical wires (not shown) into the umbilical cable 4. Thus, the ink system 2 (i.e. housing) and the printhead 3 may be fluidically and electrically connected by the umbilical cable 4. The ink supply system 5 is typically located in the cabinet or housing 2 of the printer 1 and the print head 3 is disposed outside of the cabinet, connected to the cabinet via the umbilical cable 4. In order to maintain correct consistency of the ink, the ink supply system 5 may be operable to mix ink removed from an ink cartridge with solvent removed from a solvent cartridge and to mix them together so as to obtain an ink having the correct viscosity and/or density for a particular printing application. A sensor (not shown) may be provided within the ink storage tank 15 and may be configured to generate data indicative of a viscosity of the ink. The controller 6 may be configured to obtain data indicative of ink viscosity, and control mixing operations based upon said data. Adding solvent to the ink storage tank may be controller based upon said data indicative of ink viscosity.

As noted above, the printer 1 comprises a single cartridge connection. As such, in order to permit the ink supply system to correctly manage ink consistency, the controller 6 may be configured to control the printer 1 in a particular way, and to prompt a user to provide ink and/or solvent cartridges at the cartridge connection as required, so that ink and solvent can be withdrawn from the appropriate cartridge at the appropriate time.

FIG. **5*a* shows a printer 1 in normal operation. In particular, a solvent cartridge 8S is connected to the cartridge connection 9, and the controller 6 is operable to draw solvent from the cartridge into the solvent storage tank 16 (via conduits 18, 22), from where it can be transferred to the ink storage tank 15 as required (either via conduits 20, 22, or via further conduits that are not shown) in order to maintain the consistency of ink within the ink storage tank 15 at the required level. The configuration shown in FIG. 5*a* may be referred to as a first configuration, that being a configuration in which the ink supply system 5 is configured to receive solvent from the engaged solvent cartridge 8**S.

During normal operation, solvent may be extracted from the solvent cartridge at regular intervals, so as to maintain the solvent storage tank 16 at a substantially full level. For example, a predetermined volume of solvent may be extracted from the cartridge each time that volume of solvent has been transferred from the solvent storage tank 16 to the ink storage tank 15. Solvent may also be extracted from the solvent cartridge 8S to flush the printhead during ink jet start-up and shutdown procedures. Alternatively, solvent could be extracted directly from the solvent cartridge in certain embodiments and supplied to the ink storage tank 15.

When it is detected that the ink level L within the ink storage tank 15 is below a refill threshold level L_R, and more ink is required, the controller 6 generates a user alert, prompting a user to remove the partially used solvent cartridge 8S and to connect a new ink cartridge 8I to the cartridge connection 9. This arrangement is shown in FIG. **5*b***.

Once the controller 6 has determined that an appropriate ink cartridge 8I has been connected, for example by exchanging information with an electronic device 14 associated with the installed ink cartage 8I via the data interface 13, the ink supply system 5 is caused to remove the entire contents of the ink cartridge 8I from the cartridge and to deliver it to the ink storage tank 15. The configuration shown in FIG. **5*b* may be referred to as a second configuration, that being a configuration in which the ink supply system 5 is configured to receive ink from the engaged ink cartridge 8**I.

Once the ink cartridge 8I has been emptied (or at least substantially emptied), the controller 6 generates a further user alert, prompting a user to remove the empty ink cartridge 8I and to connect a new solvent cartridge 8S (which may or may not be the same as the solvent cartridge 8S removed earlier) to the cartridge connection 9. This arrangement is shown in FIG. 5*c*. The configuration shown in FIG. 5*c* may be referred to as the first configuration, since it is a configuration in which the ink supply system 5 is configured to receive solvent from an engaged solvent cartridge 8S. While the printer is awaiting the provision of a new solvent cartridge 8S, viscosity of the ink within the ink storage tank 15 may be maintained using the solvent storage in the solvent storage tank 16.

Once the controller 6 has determined that an appropriate solvent cartridge 8S has been connected, the ink supply system 5 is caused to perform a solvent rinse operation, which draws some solvent from the solvent cartridge 8S, causing this solvent to rinse the fluid connector of the cartridge connection 9, and the conduits (e.g. conduit 18) leading from the cartridge connection 9 to the ink supply system 5.

In an embodiment, around 20-40 ml of solvent may be used to perform a solvent rinse operation. It will be understood that conduit lengths (and other component volumes) which may require flushing may be minimised during the printer design process, in order to reduce the volume of solvent used for a solvent rinse operation.

In this way, the ink has been replenished and the printer 1 is able to continue to operate and maintain ink viscosity (i.e. by introducing more solvent to the solvent storage tank 16 as required to replace solvent lost through evaporation), and the risk of pigment particles blocking or severely restricting flow within components of the ink supply system 5 is significantly reduced.

It will be understood that the presence of the solvent storage tank 16 provides a degree of flexibility in the timing of cartridge change operations. In particular, whereas it may be preferred for a solvent cartridge to be replaced immediately after an ink cartridge has been emptied, in practice this might not be convenient. As such, the presence of a solvent storage tank 16 allows a local supply of solvent to be used to maintain viscosity for a period of time after the ink cartridge has been emptied before it is necessary to again replenish the stored solvent. Additional conduits and control elements (e.g. pumps/valves) may be provided for this purpose, which are not shown. Of course, it will be understood that until a solvent cartridge has been connected to the cartridge connection 9 (as shown in FIG. 5*c*) it may not be possible to flush the fluid connector 10 and fluid conduits 18, 22 leading from the cartridge to the ink system.

In an alternative arrangement, the solvent storage tank may be omitted entirely. Such an arrangement is described in more detail below with reference to FIG. 8.

The processing performed by the controller 6 in order to monitor and manage ink replenishment in a printer having a single cartridge connection are now described with reference to FIG. 6. Processing begins at step S1, during which the printer determines whether or not the ink level in the mixing tank is below a refill threshold level L_R. If not, processing cycles via step S1 until the ink level falls below the refill threshold level L_R.

Once the ink level has fallen sufficiently low (i.e. once the controller has determined that additional ink is required), processing passes to S2, where an ink refill alert is generated. The alert may be of various types (e.g. audible, visible, on-screen, warning light, etc.).

Once the alert has been generated, the process continue to step S3, where it is checked to determine if an ink cartridge has been installed (or connected). For example, the controller 6 may be configured to detect a cartridge engaged with the cartridge connection, and determine a type of the cartridge. In particular, the controller may be configured to check the identity of any installed cartridge via the data interface 13. If the previous solvent cartridge remains in place, processing remains at step S3. Similarly, if no cartridge is detected, processing remains at step S3. If an appropriate ink cartridge (i.e. one that contains an ink type compatible with the current printer configuration, or having suitable operating parameters) is detected, then processing passes to step S4.

At step S4, substantially the entire contents of the ink cartridge is transferred from the ink cartridge to the ink storage tank 15. Once the ink transfer process is complete, processing passes to step S5. At step S5 the controller determines that additional solvent is required, and thus generates a solvent refill alert. As with the ink refill alert at step S2, the alert may take various forms.

Once the solvent refill alert has been generated, processing continues to step S6, where it is determined if a suitable solvent cartridge has been installed (or connected). For example, the controller may be configured to detect a cartridge engaged with the cartridge connection, and determine a type of the cartridge. In particular, the controller may be configured to check the identity of any installed cartridge via the data interface 13, by causing the data interface 13 to interact with any installed cartridge and to determine the cartridge identity. If the previously installed ink cartridge remains in place, processing remains at step S6. Similarly, if no cartridge is detected, processing remains at step S6. If the previously installed ink cartridge has been disconnected, and an appropriate solvent cartridge (i.e. one that contains solvent compatible with the current printer configuration) is detected, then processing passes to step S7.

At step S7, a solvent rinse operation, or cleaning operation, is performed. The solvent rinse operation process comprises removing or extracting solvent from the solvent cartridge and causing it to flow through the needle of the cartridge connection 9, and along the conduits 18 and 20 to the solvent storage tank 16. The solvent rinse operation will cause ink residue remaining in and around the fluid connector 10 (including around the needle 12) and conduit 18 from the ink transfer process to be removed. Any ink residue removed will be washed, in a highly diluted form, into the solvent storage tank 16. In this way, it is possible to reduce the likelihood that ink deposits or sediment will form around the needle 12 or within the conduit 18 which carries ink from the cartridge.

The solvent rinse operation may also cause solvent to flow from the solvent cartridge 8S and along the conduit 22 to the ink storage tank 15. In this way, ink residue remaining in the conduits leading to the ink storage tank 15 may be removed. It will be appreciated that it may be undesirable to introduce significant quantities of solvent to the ink storage tank 15 at certain times, since this could dilute the ink excessively. The conduit 22 leading to the ink storage tank 15 may instead be rinsed with solvent from the solvent storage tank 16, or with solvent taken directly from the solvent cartridge 8S, at the next time solvent is required to be added to the ink storage tank 15 in order to manage viscosity.

It can further be understood that rinsing of the needle 12 may be considered to be more urgent than the rinsing of the conduit 22. As such, while the needle rinse process may be performed very shortly (ideally as soon as possible) after installation of a solvent cartridge 8S, rinsing of the conduit 22 may effectively be accomplished, as described above, during the course of normal viscosity management operations.

It will be understood that the precise sequence of operations performed during the solvent rinse operation may be varied in dependence upon the particular fluid circuit arrangements of a particular printer. However, in general terms, it will be understood that the solvent rinse operation is intended to rinse or clean parts of the fluid circuit that are exposed to ink during the ink refill process, and which may become blocked, or restricted, if that ink is permitted to remain in place for an extended period of time. Thus a solvent rinse operation may comprise, at a minimum, causing solvent to flow from an engaged solvent cartridge via the cartridge connection into some part of the ink system.

Once the solvent rinse operation has been performed, the ink refill process terminates at step S8. The solvent cartridge may at some point be disconnected, and a new ink cartridge connected, as part of a further ink refill process.

It is further understood that in prior art printers having two cartridge connections, it may not be possible (or straightforward) to perform such a rinse process on certain parts of a fluid circuit. For example, it may never be possible (or straightforward) to cause solvent to flow through a needle (and immediately adjacent conduit) associated with an ink cartridge connection.

It can be understood that while a dual-cartridge printer provides additional flexibility in terms of when new cartridges can be added, such a configuration can result in poor cartridge management practices. This can, in turn, cause blockages or fluid pathway restrictions. For example, a new ink cartridge may in some circumstances be installed at a convenient time, but before it is needed. The ink supply system 5, and in particular the ink storage tank 15 will have a limited capacity, and may be unable to use all of the ink from a new ink cartridge if it is installed too soon. As such, an ink cartridge could be left installed for some time before ink is removed. During this period of time, sedimentation may occur, increasing the risk of blocked ink pathways.

Furthermore, once ink has been removed from the ink cartridge, any ink remaining in the fluid connection and fluid conduits may begin to dry or form sediments. As such, it is preferable for the cartridge to be removed as soon as possible after ink has been removed.

Of course, as noted above, the presence of a solvent storage tank allows printer operation to continue for some time before a new solvent cartridge must be installed after the ink transfer of step S4. In more detail, ink viscosity can be maintained for a period of time using solvent from the solvent storage tank 16. However, this time is not unlimited. Eventually the solvent storage tank 16 will be depleted, and a new solvent cartridge must be installed in order to allow the printer to maintain ink viscosity at an acceptable level within the ink storage tank 15.

While solvent use (and thus the period of time after an ink refill has been performed before a solvent cartridge is required) will depend upon many different parameters (e.g. type of solvent, ambient temperature, humidity, etc.), the solvent storage tank 16 may typically provide sufficient solvent for around eight hours printing without a solvent cartridge being installed. This time may be sufficiently short to prevent significant ink drying within the cartridge connection 7, yet sufficiently long to allow a printer operator time to return to the printer to exchange cartridges at a convenient time. That is, when only a single cartridge connection is provided, it is not necessary for an operator to remain with the printer for the duration of the ink refill operation (i.e. processing step S4 described above).

As such, by providing a single cartridge connection 9, it is possible to reinforce correct cartridge management practices, by ensuring that a solvent cartridge remains installed for a majority of the time. It is noted that in continuous inkjet printing, solvent use is often many times greater than ink use (due to solvent loss from the system). The ratio of solvent use to ink use will vary significantly between different applications, but could typically be around 5:1, and could, for example, vary from around 1:1 to around 40:1. As such, it is preferable for a solvent cartridge to be installed in the cartridge connection for as much of the time as possible.

As described above, the period after ink refilling (step S4) but before solvent rinsing (step S7) is preferably as short as possible. However, this period is not strictly limited to a particular duration. Similarly, it may not be necessary to install an ink cartridge immediately after a low ink level is detected at step S1. In particular, the ink storage tank 15 may comprise an ink reserve volume, which allows printing to continue for a period of time after the ink refill threshold level L_R has been passed and before which ink levels become too low to continue printing. The ink reserve volume may, for example, comprise around 10-20% of the total mixing tank volume, meaning that printing can continue using the ink reserve volume for a period of several hours (or longer) after a refill alert has been generated. This period allows for continuous printer operation, and allows for ink refills to be performed at the next convenient time after an alert is raised.

It will be appreciated that in addition to the ink refill alert generated at step S2 further alerts might be generated when lower ink levels are reached, or after extended periods of operation after the initial alert. Such subsequent alerts may be configured to be more noticeable. Eventually, printing operations may be caused to stop before print quality is (negatively) affected, and while automatic (i.e. without the need for a service technician) recovery remains possible.

It can further be understood that the ink refill threshold level L_R referred to in step S1 to trigger the ink refill alert may correspond to a level at which there is sufficient capacity within the ink storage tank 15 to accommodate the entire contents of an ink cartridge of a nominal capacity. That is, in view of the process described above with reference to step S4, during which the entire contents of the installed ink cartridge is transferred to the ink storage tank 15 in a single operation, it can be understood that if the available capacity in the tank 15 was less than the volume of a cartridge, the entire contents of the cartridge could not be added to the ink storage tank 15. Thus, when the contents of a full ink cartridge is added, the ink level in the mixing tank will increase from around the ink refill threshold level L_R to a maximum ink level L_M (as illustrated in FIG. 4).

In an example arrangement, the ink storage tank 15 capacity may be around 1000 ml, while the low ink level alert may be triggered when the volume of ink remaining in the tank is around 200 ml. Thus, it is possible for around 700 ml of ink to be added to the ink storage tank 15 during a refilling operation. This volume corresponds to a typical ink cartridge volume. Of course, some additional capacity may be provided within the ink storage tank 15. For example, some capacity in excess of the maximum ink level L_M may be provided.

It will be understood that the volumes described above are provided as examples only, and that alternative volumes may be provided for storage tanks 15, 16 and cartridges 8I, 8S as required for a particular application. The controller 6 may be configured to obtain information from the smart chip 14 associated with the cartridge 8, allowing the printer to be operated in a manner that is consistent with an installed cartridge.

As with repeated low ink level alerts, the solvent refill alert generated at step S5 may be followed by further alerts if operations continue without a solvent cartridge being replaced (either based on a detected solvent level, and/or based on a period of operation). As with the low ink level alerts, such subsequent alerts may be configured to be sequentially more noticeable. Eventually, printing operations may be ceased before the printer is damaged (which could occur if printing is attempted with ink having a viscosity which is too high).

Once the ink refill process has been completed, normal printer operations will then resume, with further solvent being extracted from the solvent cartridge 8S to top up the solvent storage tank 16 as required. Moreover, during shutdown and startup processes, solvent may be extracted directly from the solvent cartridge 8S (rather than from the solvent storage tank 16) to flush or rinse the printhead, thereby ensuring that clean (i.e. non-contaminated) solvent is used for this printhead cleaning process. It will be understood, therefore, that it is preferable for a solvent cartridge to be replaced within the print as soon as possible after an ink cartridge has been provided, so as to minimise the likelihood of a printer shutdown event being initiated while an (empty) ink cartridge 8I remains engaged with the cartridge connection 11. In such circumstances, solvent from the solvent storage tank 16 may be use for printhead cleaning. However, such operation may not be preferred.

As described above, during step S4, the entire contents of the engaged ink cartridge is emptied into the ink storage tank 15. By the "entire contents" or "substantially the entire contents" of the cartridge it may be meant that a very substantial portion (e.g. greater than 90%) of the contents is extracted. Further, whereas it may be preferred for the extraction to occur in a single (i.e. non-stop) operation, the extraction may alternatively be performed in a series of sub-operations. Preferably the entire extraction (whether a single operation, or several sub-operations) occurs in a relatively short time period, so as to minimise, or at least reduce, the duration of the ink extraction operation, and associated sedimentation risk. The ink extraction operation is preferably configured to last a shorter duration than is required for a solvent cartridge to be replaced. In this way, printing operations can continue uninterrupted when an ink cartridge is replaced.

As described briefly above, the identity of an installed cartridge is determined at steps S3 and S6. Other data may also be exchanged via the data interface 13 with electronic storage devices 14 associated with the cartridges 8 during operations to facilitate correct printer operation. The electronic storage devices (smart chips) and communications between the smart chips and the printer may be similar to those described in WO2017/194913, or alternatively in WO2009/047511, the contents of both applications being hereby incorporated by reference.

The controller 6 described above may be any suitable device known in the art, and typically includes at least a processor and memory. FIG. 7 shows the controller 6 of a particular embodiment in further detail. It can be seen that the controller 6 comprises a CPU 6*a* which is configured to read and execute instructions stored in a volatile memory 6*b* which takes the form of a random access memory. The volatile memory 6*b* stores instructions for execution by the CPU 6*a* and data used by those instructions. For example, in use, data relating to an image to be printed by the printer 1 (image data) or printer configuration or control data (printing data) may be stored in the volatile memory 6*b*. The controller 6 further comprises non-volatile storage in the form of a hard disc drive 6*c*. Of course, other forms of non-volatile storage may be used. Image and/or printing data may be stored on the hard disc drive 6*c*. The controller 6 further comprises an I/O interface 6*d* to which are connected peripheral devices used in connection with the controller 6. More particularly, the display 7 is configured so as to display output from the controller 6. The display 7 may, for example, display a control interface for the printer 1. Input devices are also connected to the I/O interface 6*d*. Such input devices may, for example, include a touch screen interface which is associated with the display 7 allow user interaction with the controller 6. A network interface 6*f* allows the controller 6 to be connected to an appropriate computer network so as to receive and transmit data from and to other computing devices. The CPU 6*a*, volatile memory 6*b*, hard disc drive 6*c*, I/O interface 6*d*, and network interface 6*g*, are connected together by a bus 6*g*.

The controller 6 further comprises an authentication device 6*h*. The authentication device 6*h* is connected to the CPU 6*a* by the bus 6*g*. The authentication device 6*h* is a secure authentication and validation device, such as, for example an ATSHA204 CryptoAuthenication device manufactured by Atmel Corporation, United States. The authentication device 6*h* communicates with the CPU 6*a* via a serial data connection such as, for example, an $I^2C$ interface. It will be appreciated, however, that alternative secure authentication and validation devices may be used, and may communicate with the CPU 6*a* in a different way (e.g. via the I/O interface 6*d*). The I/O interface 6*d* permits communications between the controller 6 and the various electronic storage devices 14, 17. Such communications may, for example, use an I2C interface.

As described above, the solvent storage tank may be omitted entirely. FIG. 8 shows an alternative printer 1' in which an alternative ink supply system 5' is provided which does not include a solvent storage tank. Most components are identical to their equivalently numbered counterparts described above with reference to the printer 1 shown in FIG. 3, and will not be described again. However, solvent storage tank 16, conduit branch 20, and valve 21 are omitted.

A further change is that conduit 22' does not branch from conduit 18 after the pump 19. Rather, conduit 22' branches from conduit 18 before the pump 19, meaning that the pump 19 is not configured to pump fluid from the cartridge 8 to the ink storage tank 15. Rather, a further pump 28 (e.g. a Venturi pump) is provided within the ink storage tank 15 which is connected to conduit 22', via a valve 23'. The pump 28 may be operable to draw fluid into the ink storage tank 15 from the cartridge 8, and allows the number of components exposed to ink during an ink refill operation to be reduced. In particular, since the pump 19 is not exposed to ink during an ink refill operation, it does not require cleaning. The pump 28 may be operated by causing an ink pump (not shown) to cause ink to flow (e.g. recirculate) within the ink storage tank 15, causing a vacuum pressure to be generated on conduit 22' (provided valve 23' is open).

The pumping arrangement described above could also be applied to a printer having a solvent storage tank. For example, the pump 19 could be configured to supply solvent from a solvent cartridge to either of the solvent tank or the printhead, whereas the additional pump 28 could be provided to supply ink to the ink storage tank 15. This would again reduce the need to clean the pump 19 after an ink refill operation.

The ink storage tank 15 and the solvent storage tank 16 may each be referred to as a location within the printer, or a location within the apparatus for printing. That is, during operation, ink or solvent may be transferred to a location within the apparatus (or printer). The location could be the ink storage tank 15 or the solvent storage tank 16, or one or more further locations. It will be appreciated that where reference is made to "a location within the apparatus" more than once, this could be a single location, or several different locations.

It all also be appreciated that further alternative fluid connection, storage, and pumping arrangements can be provided to allow operation of a printer having a single cartridge connection, and that the arrangements described herein are intended to be illustrative, rather than limiting. Such alternative arrangements may also require operating processes that are different from those described above.

While embodiments of the present disclosure are described above, it will be appreciated that these are provided by way of example only, and are not intended to be limiting in nature. Indeed, various alternatives and variations to the specific embodiments described herein will be understood to be possible without departing from the scope of the present disclosure. The scope of the invention is defined by the appended claims.

In addition to or as an alternative to the above, the following examples are described. The features described in any of the following examples may be utilized with any of the other examples described herein.

Example 1. Apparatus for continuous ink jet printing, comprising:

- an ink system comprising an ink storage tank operable to supply ink to a print head associated with the apparatus;
- a single cartridge connection for releasable engagement with a fluid cartridge, the cartridge connection comprising: a fluid connector for engaging an outlet of a fluid cartridge; and
- a conduit configured to allow fluid to flow along a fluid pathway from a cartridge engaged with the cartridge connection, via the fluid connector, to the ink storage tank;
- the apparatus having:
  - a first configuration in which a solvent cartridge is engaged with the cartridge connection and in which the apparatus is configured to receive solvent from the engaged solvent cartridge; and
  - a second configuration in which an ink cartridge is engaged with the cartridge connection and in which the apparatus is configured to receive ink from the engaged ink cartridge.

Example 2. The apparatus according to example 1, wherein the fluid connector is configured to engage an outlet of the solvent cartridge in the first configuration of the apparatus, and is configured to engage an outlet of the ink cartridge in the second configuration of the apparatus.

Example 3. The apparatus according to example 1 or 2, wherein the cartridge connection comprises a needle configured to receive both ink and solvent.

Example 4. The apparatus according to any one of examples 1 to 3, wherein the cartridge connection comprises a data interface configured to obtain data indicative of the contents of an engaged cartridge.

Example 5. The apparatus according to example 4, wherein the data interface comprises an electrical contact configured to contact a corresponding contact on an engaged fluid cartridge.

Example 6. The apparatus according to any preceding example comprising a housing containing the ink system, wherein the printhead is disposed externally of the housing.

Example 7. The apparatus according to any preceding example, further comprising the printhead.

Example 8. The apparatus according to any preceding example, wherein the printhead is connected to the ink system via an umbilical.

Example 9. The apparatus according to any preceding example, wherein, in the second configuration, the apparatus is configured to extract substantially the entire contents of the engaged ink cartridge from the cartridge and into ink storage tank.

Example 10. The apparatus according to any preceding example, wherein, in the first configuration, the apparatus is configured to extract solvent from the engaged solvent cartridge and provide the solvent into a solvent storage tank.

Example 11. The apparatus according to any preceding example, wherein the apparatus is configured to add solvent to the ink storage tank based upon data indicative of ink viscosity.

Example 12. The apparatus according to any preceding example, further comprising a controller configured to control operations of the ink system and the printhead.

Example 13 The apparatus according to example 12, wherein the controller is configured to detect a cartridge engaged with the cartridge connection, and determine a type of the cartridge.

Example 14. The apparatus according to example 12 or 13, wherein the controller is configured to determine that additional ink is required and generate an indication that additional ink is required.

Example 15. The apparatus according to example 14, wherein the controller is configured to:

- detect an ink cartridge engaged with the cartridge connection; and
- cause the ink system to extract substantially the entire contents of the engaged ink cartridge from the cartridge and into ink storage tank.

Example 16. The apparatus according to any one of examples 12 to 15, wherein the controller is configured to determine that additional solvent is required and generate an indication that additional solvent is required.

Example 17. The apparatus according to example 16, wherein the controller is configured to:

- detect a solvent cartridge engaged with the cartridge connection; and
- cause the ink system to extract solvent from the engaged solvent cartridge into the ink system.

Example 18. The apparatus according to example 17, wherein the controller is configured to:

- detect a solvent cartridge engaged with the cartridge connection after an ink refill operation has been performed; and
- cause the ink system to perform a cleaning operation.

Example 19. The apparatus according to example 18, wherein the cleaning operation comprises:

- causing solvent to flow from the engaged solvent cartridge via the cartridge connection into the ink system.

Example 20. A method of operating an apparatus for continuous ink jet printing, the apparatus comprising:

- an ink system comprising an ink storage tank operable to supply ink to a print head associated with the apparatus;
- a single cartridge connection for releasable engagement with a fluid cartridge, the cartridge connection comprising: a fluid connector for engaging an outlet of a fluid cartridge; and
- a conduit configured to allow fluid to flow along a fluid pathway from a cartridge engaged with the cartridge connection, via the fluid connector, to the ink storage tank;

the method comprising:

in a first configuration in which a solvent cartridge is engaged with the cartridge connection, receiving solvent from the engaged solvent cartridge; and in a second configuration in which an ink cartridge is engaged with the cartridge connection, receiving ink from the engaged ink cartridge.

Example 21. A method according to example 20, wherein the method comprises, determining that additional ink is required to be added to the ink storage tank and generating an indication that additional ink is required.

Example 22 A method according to example 20 or 21, wherein the method comprises detecting a cartridge engaged with the cartridge connection, and determining a type of the cartridge.

Example 23. A method according to any one of examples 20 to 22, wherein the method comprises detecting an ink cartridge engaged with the cartridge connection, and causing the ink system to extract substantially the entire contents of the engaged ink cartridge from the cartridge and into ink storage tank.

Example 24. A method according to example 23, wherein the method comprises:

detecting a solvent cartridge engaged with the cartridge connection after an ink refill operation has been performed; and causing the ink system to perform a cleaning operation.

Example 25. A method according to example 24, wherein the cleaning operation comprises causing solvent to flow from the engaged solvent cartridge via the cartridge connection into the ink system.

Example 26. A method of operating an apparatus for ink jet printing, the method comprising:

connecting an ink cartridge with a cartridge connection of the apparatus;

transferring ink from the ink cartridge to a location within the apparatus;

disconnecting the ink cartridge from the cartridge connection of the apparatus; and connecting a solvent cartridge with the cartridge connection of the apparatus.

Example 27. The method according to example 26, further comprising, after connecting the solvent cartridge with the cartridge connection of the apparatus, transferring solvent from the solvent cartridge to a location within the apparatus.

Example 28. The method according to example 26 or 27, wherein transferring solvent from the solvent cartridge to a location within the apparatus and transferring ink from the ink cartridge to a location within the apparatus comprises pumping ink or solvent from the respective cartridge via the same cartridge connection.

Example 29. The method according to any one of examples 26 to 28, where transferring solvent from the solvent cartridge to a location within the apparatus comprises transferring solvent from the solvent cartridge to a solvent storage tank within the apparatus, or an ink storage tank within the apparatus.

Example 30. The method according to any one of examples 26 to 29, where transferring ink from the ink cartridge to a location within the apparatus comprises transferring ink from the ink cartridge to an ink storage tank within the apparatus.

Example 31. The method according to any one of examples 26 to 30, wherein the method comprises:

determining that additional ink is required to be added to a location within the apparatus, and generating an indication that additional ink is required.

Example 32. The method according to any one of examples 26 to 31, wherein the method comprises:

detecting a cartridge engaged with the cartridge connection, and determining a type of the detected cartridge.

Example 33. The method according to any one of examples 26 to 32, wherein the method comprises:

detecting an ink cartridge engaged with the cartridge connection, and after the ink cartridge has been detected, causing the ink system to extract substantially the entire contents of the detected ink cartridge from the cartridge and into an ink storage tank within the apparatus.

Example 34. The method according to example 33, wherein the method comprises:

detecting a solvent cartridge engaged with the cartridge connection after an ink refill operation has been performed; and after the solvent cartridge has been detected, performing a cleaning operation.

Example 35. The method according to example 34, wherein the cleaning operation comprises causing solvent to flow from the detected solvent cartridge via the cartridge connection into an ink system of the apparatus.

Example 36. The method according to any one of examples 20 to 35, wherein the apparatus is a continuous inkjet printer, the method further comprising: performing a printing operation comprising supplying ink to a print head associated with the continuous inkjet printer.

The invention claimed is:

1. An apparatus for continuous ink jet printing, comprising:

an ink system comprising an ink storage tank operable to supply ink to a print head associated with the apparatus;

a single cartridge connection for releasable engagement with a fluid cartridge, the cartridge connection comprising:

a fluid connector for engaging an outlet of a fluid cartridge, the fluid connector comprising a needle configured to receive both ink and solvent; and a conduit configured to allow fluid to flow along a fluid pathway from a cartridge engaged with the cartridge connection, via the fluid connector, to the ink storage tank;

the apparatus having:

a first configuration in which a solvent cartridge is engaged with the cartridge connection and in which the apparatus is configured to receive solvent from the engaged solvent cartridge; and a second configuration in which an ink cartridge is engaged with the cartridge connection and in which the apparatus is configured to receive ink from the engaged ink cartridge.

2. The apparatus according to claim 1, wherein the fluid connector is configured to engage an outlet of the solvent cartridge in the first configuration of the apparatus, and is configured to engage an outlet of the ink cartridge in the second configuration of the apparatus.

3. The apparatus according to claim 1, wherein the cartridge connection comprises a data interface configured to obtain data indicative of the contents of an engaged cartridge.

4. The apparatus according to claim 1, wherein, in the second configuration, the apparatus is configured to extract substantially the entire contents of the engaged ink cartridge from the cartridge and into ink storage tank.

5. The apparatus according to claim 1, wherein, in the first configuration, the apparatus is configured to extract solvent from the engaged solvent cartridge and provide the solvent into a solvent storage tank.

6. The apparatus according to claim 1, further comprising a controller configured to control operations of the ink system and the print head.

7. The apparatus according to claim 6, wherein the controller is configured to detect a cartridge engaged with the cartridge connection, and determine a type of the cartridge.

8. The apparatus according to claim 6, wherein the controller is configured to determine that additional ink is required and generate an indication that additional ink is required.

9. The apparatus according to claim 8, wherein the controller is configured to:

detect an ink cartridge engaged with the cartridge connection; and cause the ink system to extract substantially the entire contents of the engaged ink cartridge from the cartridge and into ink storage tank.

10. The apparatus according to claim 6, wherein the controller is configured to determine that additional solvent is required and generate an indication that additional solvent is required.

11. The apparatus according to claim 10, wherein the controller is configured to:

detect a solvent cartridge engaged with the cartridge connection; and cause the ink system to extract solvent from the engaged solvent cartridge into the ink system.

12. The apparatus according to claim 11, wherein the controller is configured to:

detect a solvent cartridge engaged with the cartridge connection after an ink refill operation has been performed; and cause the ink system to perform a cleaning operation.

13. A method of operating an apparatus for ink jet printing, the method comprising:

connecting an ink cartridge with a cartridge connection of the apparatus;

detecting an ink cartridge engaged with the cartridge connection;

after the ink cartridge has been detected, causing an ink system to extract substantially the entire contents of the detected ink cartridge from the cartridge and into an ink storage tank within the apparatus;

disconnecting the ink cartridge from the cartridge connection of the apparatus;

connecting a solvent cartridge with the same cartridge connection of the apparatus previously connected to the ink cartridge;

detecting a solvent cartridge engaged with the cartridge connection after an ink refill operation has been performed; and after the solvent cartridge has been detected, performing a cleaning operation.

14. The method according to claim 13, further comprising, after connecting the solvent cartridge with the cartridge connection of the apparatus, transferring solvent from the solvent cartridge to a location within the apparatus.

15. The method according to claim 13, wherein transferring solvent from the solvent cartridge to a location within the apparatus and transferring ink from the ink cartridge to a location within the apparatus comprises pumping ink or solvent from the respective cartridge via the same cartridge connection.

16. The method according to claim 13, wherein the method comprises:

determining that additional ink is required to be added to a location within the apparatus; and generating an indication that additional ink is required.

17. The method according to claim 13, wherein the method comprises:

detecting a cartridge engaged with the cartridge connection; and determining a type of the detected cartridge.

18. An apparatus for continuous ink jet printing, comprising:

an ink system comprising an ink storage tank operable to supply ink to a print head associated with the apparatus;

a single cartridge connection for releasable engagement with one of an ink cartridge or a solvent cartridge, the single cartridge connection comprising:

a fluid connector for engaging an outlet of the one of the ink cartridge or the solvent cartridge; and a conduit configured to allow ink or solvent to flow along a fluid pathway from the one of the ink cartridge or the solvent cartridge engaged with the single cartridge connection, via the fluid connector, to the ink storage tank;

the apparatus having:

a first configuration in which the one of the ink cartridge or the solvent cartridge is the solvent cartridge, and the solvent cartridge is engaged with the single cartridge connection and in which the apparatus is configured to receive solvent from the engaged solvent cartridge; and a second configuration in which the one of the ink cartridge or the solvent cartridge is the ink cartridge, and the ink cartridge is engaged with the single cartridge connection and in which the apparatus is configured to receive ink from the engaged ink cartridge, the apparatus further comprising a controller configured to control operations of the ink system and the print head, wherein the controller is configured to:

determine that additional solvent is required and generate an indication that additional solvent is required;

detect that the solvent cartridge is engaged with the single cartridge connection; and cause the ink system to extract solvent from the engaged solvent cartridge into the ink system.

* * * * *